(12) United States Patent
Lu

(10) Patent No.: US 11,762,484 B1
(45) Date of Patent: Sep. 19, 2023

(54) MOUSE AND BACK COVER OF A HOLDING DEVICE ADJUSTABLE FOR LEFT AND RIGHT HAND SHAPES

(71) Applicant: DEXIN CORPORATION, New Taipei (TW)

(72) Inventor: Ho-Lung Lu, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/826,147

(22) Filed: May 26, 2022

(30) Foreign Application Priority Data

Mar. 17, 2022 (TW) .................................. 111109767

(51) Int. Cl.
*G06F 3/0354* (2013.01)
(52) U.S. Cl.
CPC .. *G06F 3/03543* (2013.01); *G06F 2203/0332* (2013.01)
(58) Field of Classification Search
CPC ...................... G06F 3/03543; G06F 2203/0332
See application file for complete search history.

(56) References Cited

U.S. PATENT DOCUMENTS

| 6,157,370 | A  | * | 12/2000 | Kravtin | G06F 3/03543 |
| | | | | | 248/118.1 |
| 9,927,890 | B1 | * | 3/2018 | Perlman | G06F 3/03543 |
| 2003/0103040 | A1 | * | 6/2003 | Koike | G06F 3/03543 |
| | | | | | 345/163 |
| 2008/0129693 | A1 | * | 6/2008 | Chen | G06F 3/03543 |
| | | | | | 345/157 |
| 2016/0334865 | A1 | * | 11/2016 | Siegfried | G06F 3/01 |
| 2018/0011558 | A1 | * | 1/2018 | Chao | G06F 3/03543 |

* cited by examiner

*Primary Examiner* — Ariel A Balaoing
(74) *Attorney, Agent, or Firm* — Li & Cai Intellectual Property Office

(57) ABSTRACT

A mouse and a back cover of a holding device adjustable for left and right hand shapes are provided. The mouse includes: a key module that includes at least one button unit, a circuit base that includes a bottom casing and a control module, and a housing module fixed to the circuit base. The control module is electrically connected to the at least one button unit. The housing module includes a movable housing and a fixing assembly. The movable housing is operable to move left or right relative to the circuit base and switch between left-side and right-side positions. The fixing assembly is operable to fix the movable housing, which is located at the left-side or the right-side position, with the circuit base. When the movable housing is located at the left-side or the right-side position, the mouse is adapted for a right-handed or a left-handed user, respectively.

18 Claims, 14 Drawing Sheets

MOUSE AND BACK COVER OF A HOLDING DEVICE ADJUSTABLE FOR LEFT AND RIGHT HAND SHAPES

CROSS-REFERENCE TO RELATED PATENT APPLICATION

This application claims the benefit of priority to Taiwan Patent Application No. 111109767, filed on Mar. 17, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse and a back cover, and more particularly to a mouse that is capable of changing shape according to a dominant hand of a user and a back cover of a holding device adjustable for left and right hand shapes.

BACKGROUND OF THE DISCLOSURE

Conventionally, an ergonomic mouse is designed to be applicable only to users whose dominant hand is the right hand or to those whose dominant hand is the left hand. Hence, users with different dominant hands are required to purchase different mice corresponding to their dominant hands, or otherwise have a difficult time using them.

While a mouse adapted for different users with different dominant hands is available in the marketplace, such a mouse essentially has a shape that is bilaterally symmetrical. Even though this mouse can indeed be used by users with different dominant hands, a grip feeling thereof is obviously poorer than that of the above-mentioned ergonomic mouse.

SUMMARY OF THE DISCLOSURE

In response to the above-referenced technical inadequacies, the present disclosure provides a mouse and a back cover of a holding device adjustable for left and right hand shapes, so as to address an issue in which an ergonomic mouse that is currently available fails to be simultaneously adapted for users with different dominant hands.

In one aspect, the present disclosure provides a mouse, which includes a key module, a circuit base, and a housing module. The key module includes at least one button unit. The circuit base includes a bottom casing and a control module, and the control module is electrically connected to the at least one button unit. The housing module is fixed to the circuit base, and the housing module includes at least one movable housing and a fixing assembly. The at least one movable housing is operable to move left or right relative to the circuit base and switch between a left-side position and a right-side position. The fixing assembly is operable to fix the at least one movable housing, which is located at the left-side position or the right-side position, with the circuit base. The mouse is adapted for a right-handed user when the at least one movable housing is located at the left-side position, and the mouse is adapted for a left-handed user when the at least one movable housing is located at the right-side position.

In another aspect, the present disclosure provides a back cover of a holding device adjustable for left and right hand shapes, which is fixed to a circuit base of a mouse. The back cover includes at least one movable housing and a fixing assembly. The at least one movable housing is operable to move left or right relative to the circuit base and switch between a left-side position and a right-side position. The fixing assembly is operable to fix the at least one movable housing, which is located at the left-side position or the right-side position, with the circuit base. The mouse is adapted for a right-handed user when the at least one movable housing is located at the left-side position, and the mouse is adapted for a left-handed user when the at least one movable housing is located at the right-side position.

Therefore, in the mouse and the back cover of the holding device adjustable for left and right hand shapes provided by the present disclosure, through configuration of the housing module, the user is able to operate (i.e., manipulate) the movable housing and fixed components according to his/her dominant hand, so that the shape of the mouse can be changed in a corresponding manner. In this way, an ergonomically improved mouse can be obtained to suit the needs of different users.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
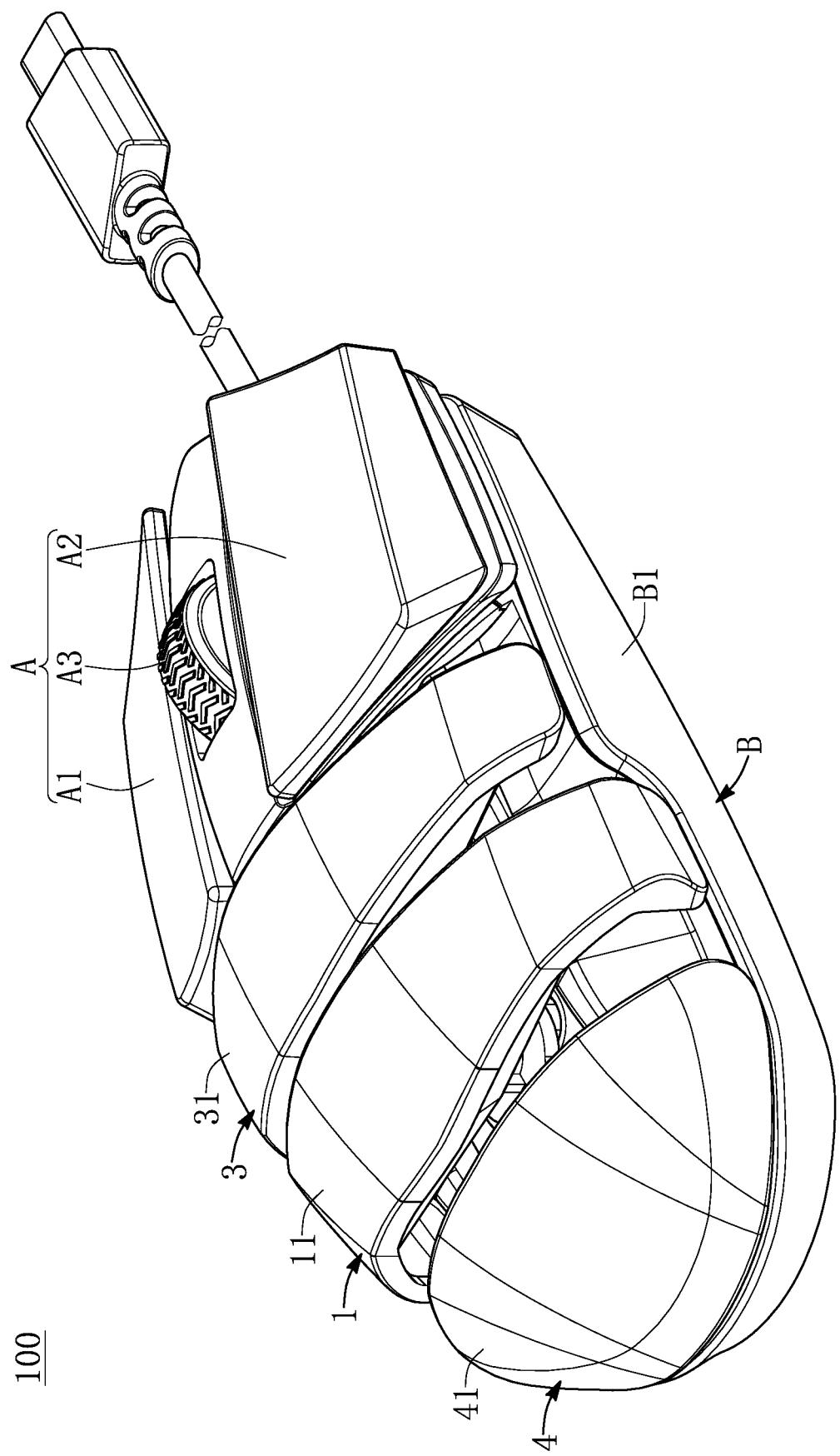
FIG. 1 to FIG. 3 are each a schematic view of a mouse according to the present disclosure from different angles of view.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
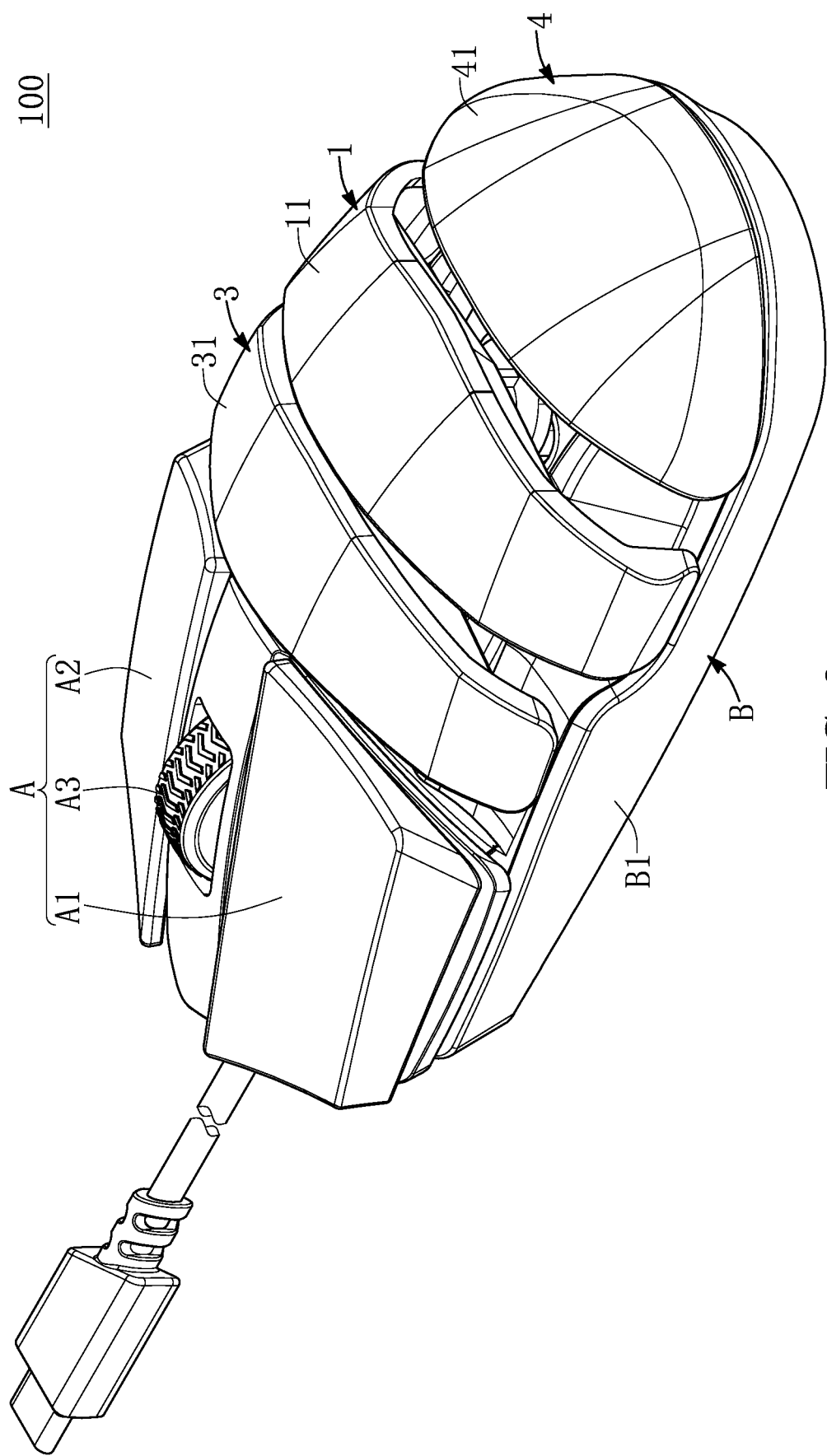
Figure 3:
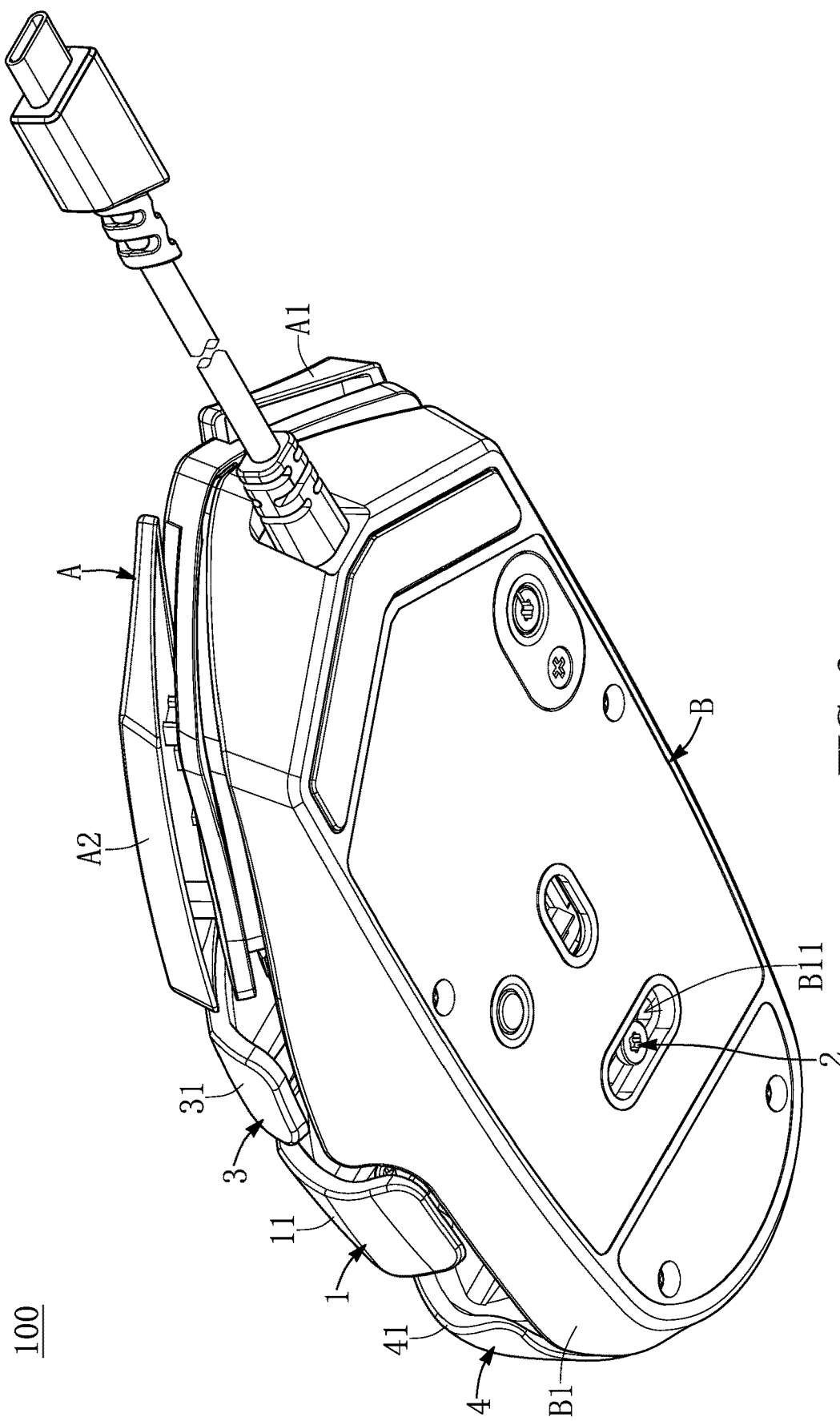
Figure 4:
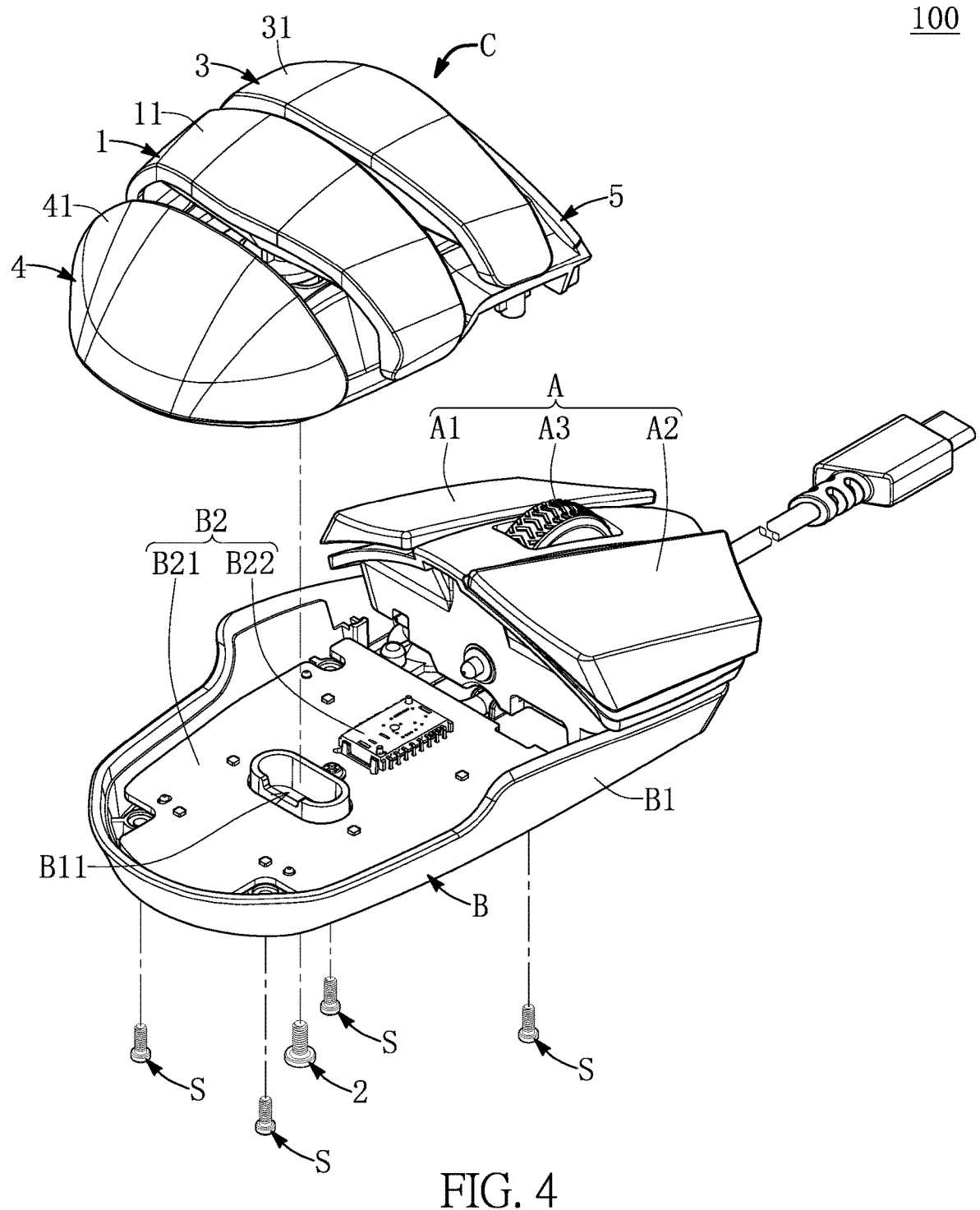
FIG. 4 and FIG. 5 are each a partial exploded view of the mouse according to the present disclosure from different angles of view.
Figure 5:
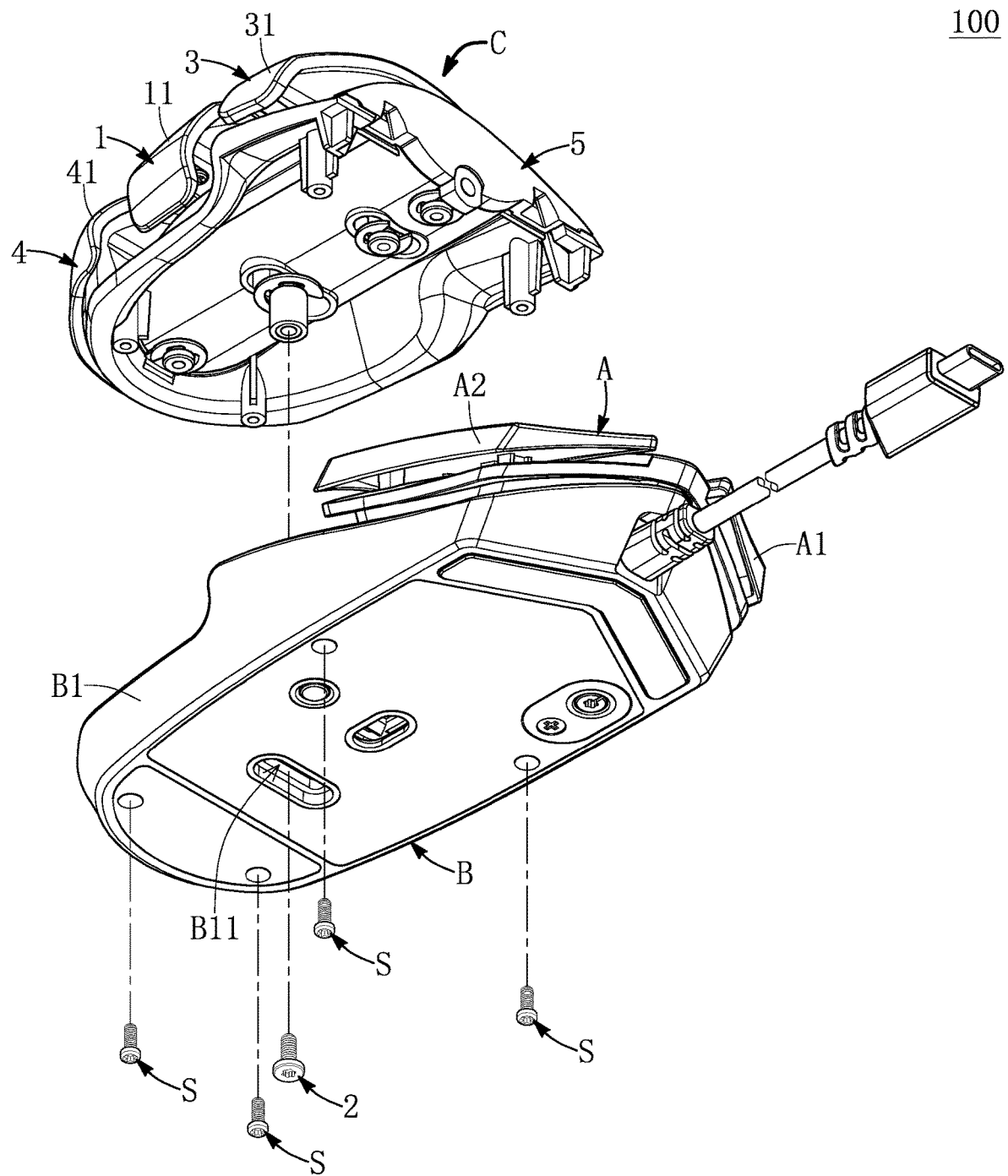

Reference is made to FIG. 1 to FIG. 5. FIG. 1 to FIG. 3 are each a schematic view of a mouse according to the present disclosure from different angles of view, and FIG. 4 and FIG. 5 are each a partial exploded view of the mouse according to the present disclosure from different angles of view. A mouse 100 of the present disclosure includes a key module A, a circuit base B, and a housing module C. The key module A includes two button units and a scroll wheel unit A3. The two button units are a left button unit A1 and a right button unit A2, respectively. A quantity of the button units provided by the key module A is not limited to two. In practice, the quantity of the button units can be changed according to actual requirements. In different embodiments, the key module A can also not include the scroll wheel unit A3.

The circuit base B includes a bottom casing B1 and a control module B2. The control module B2 is fixed to the bottom casing B1, and is electrically connected to the left button unit A1, the right button unit A2, and the scroll wheel unit A3. The control module B2 can include, for example, a circuit board B21, a microprocessor B22, a power supply unit, etc. When the left button unit A1, the right button unit A2, or the scroll wheel unit A3 is being operated, the control module B2 can generate a corresponding signal and transmit the same to a relevant electronic device (e.g., a computer, a cell phone, and a tablet computer). In practice, the circuit base B can further include a rechargeable battery, and the control module B2 can have a corresponding charging port. Or, the circuit base B can have a space for accommodating a dry cell. However, the present disclosure is not limited thereto.

Figure 6:
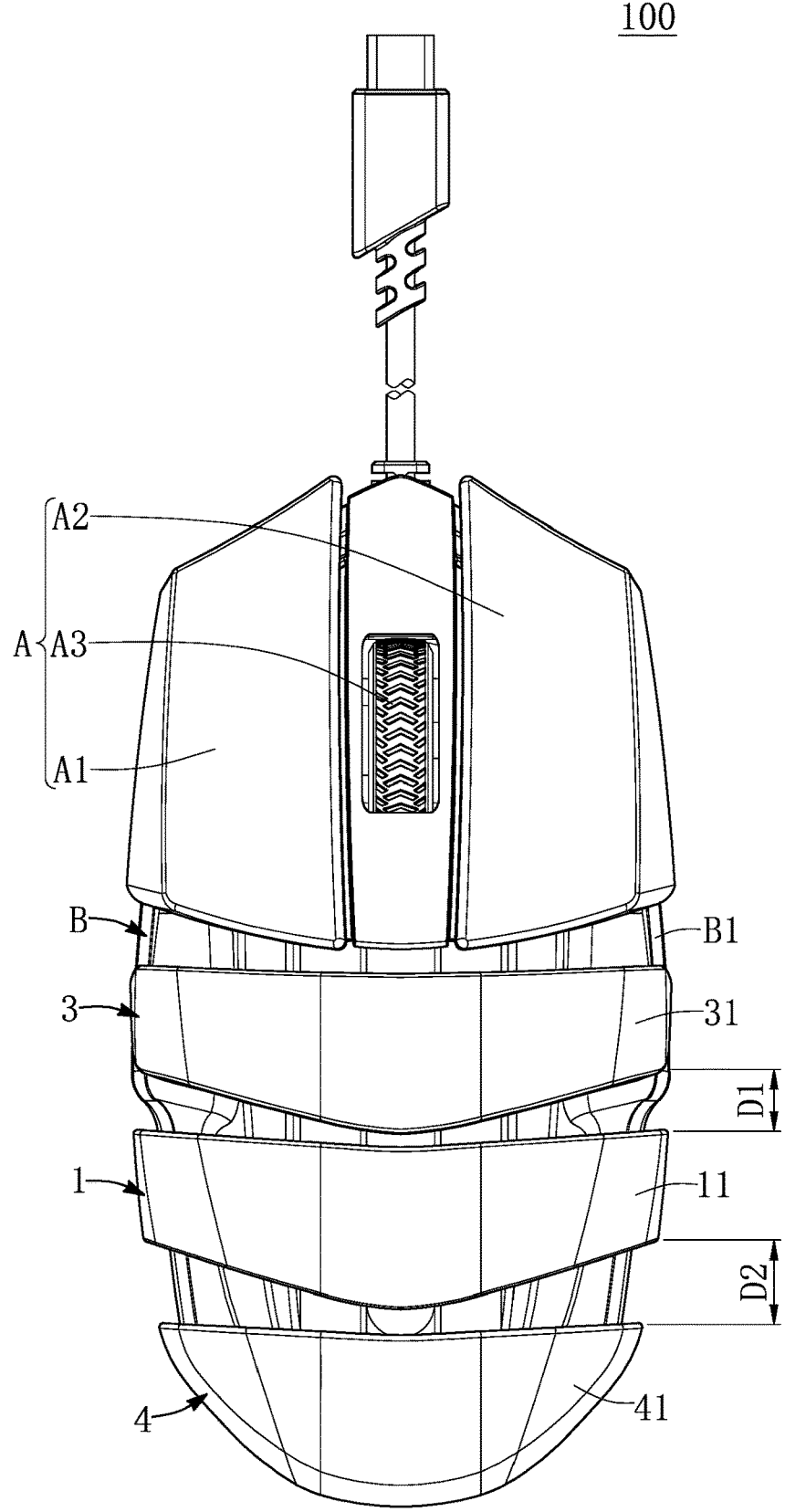
FIG. 6 is a top view of a movable housing and rotatable housings of the mouse when not in use according to the present disclosure.
Figure 7:
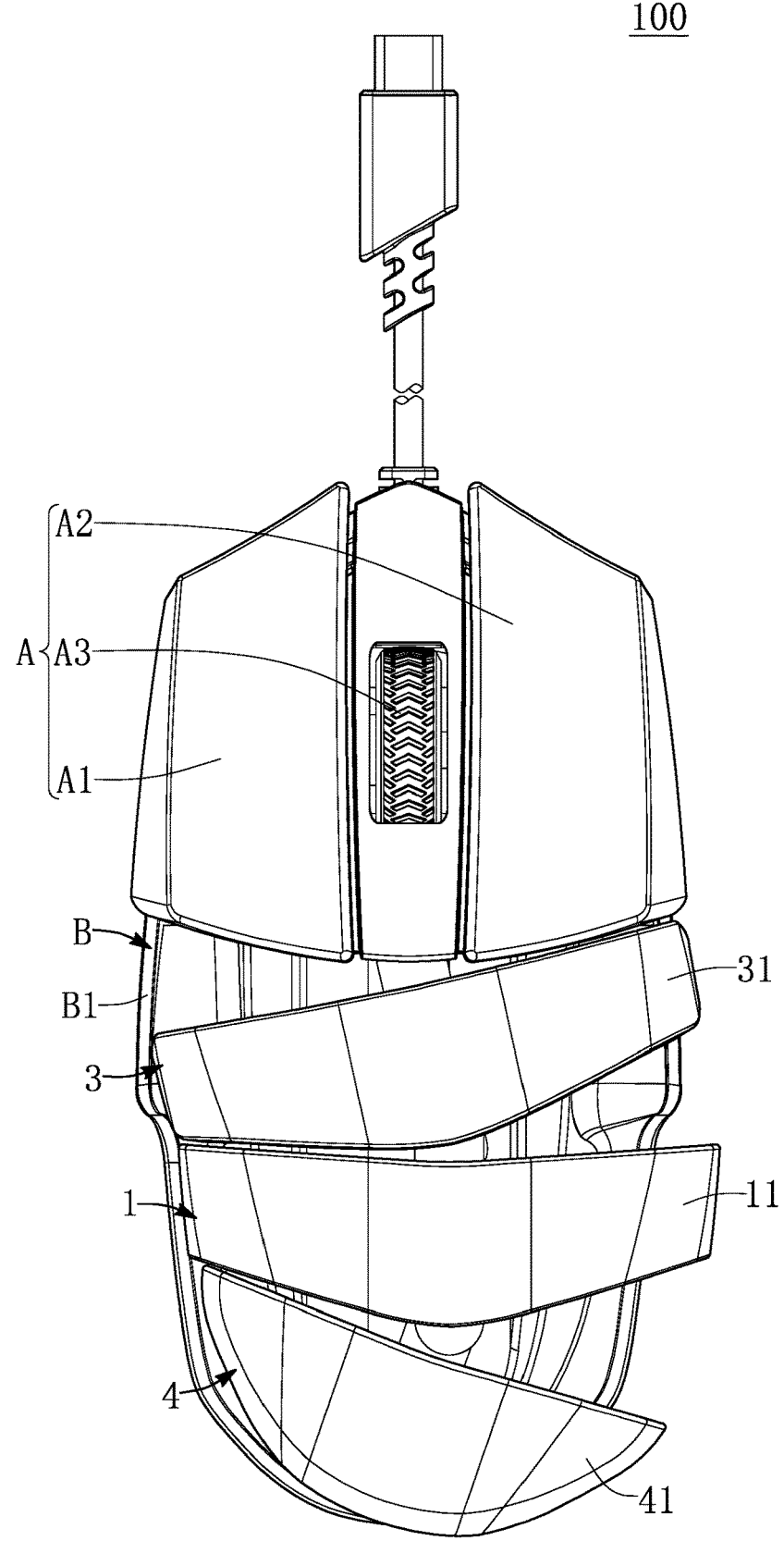
FIG. 7 is a top view showing a housing module of the mouse being operated to be adapted for a right-handed user according to the present disclosure.
Figure 8:
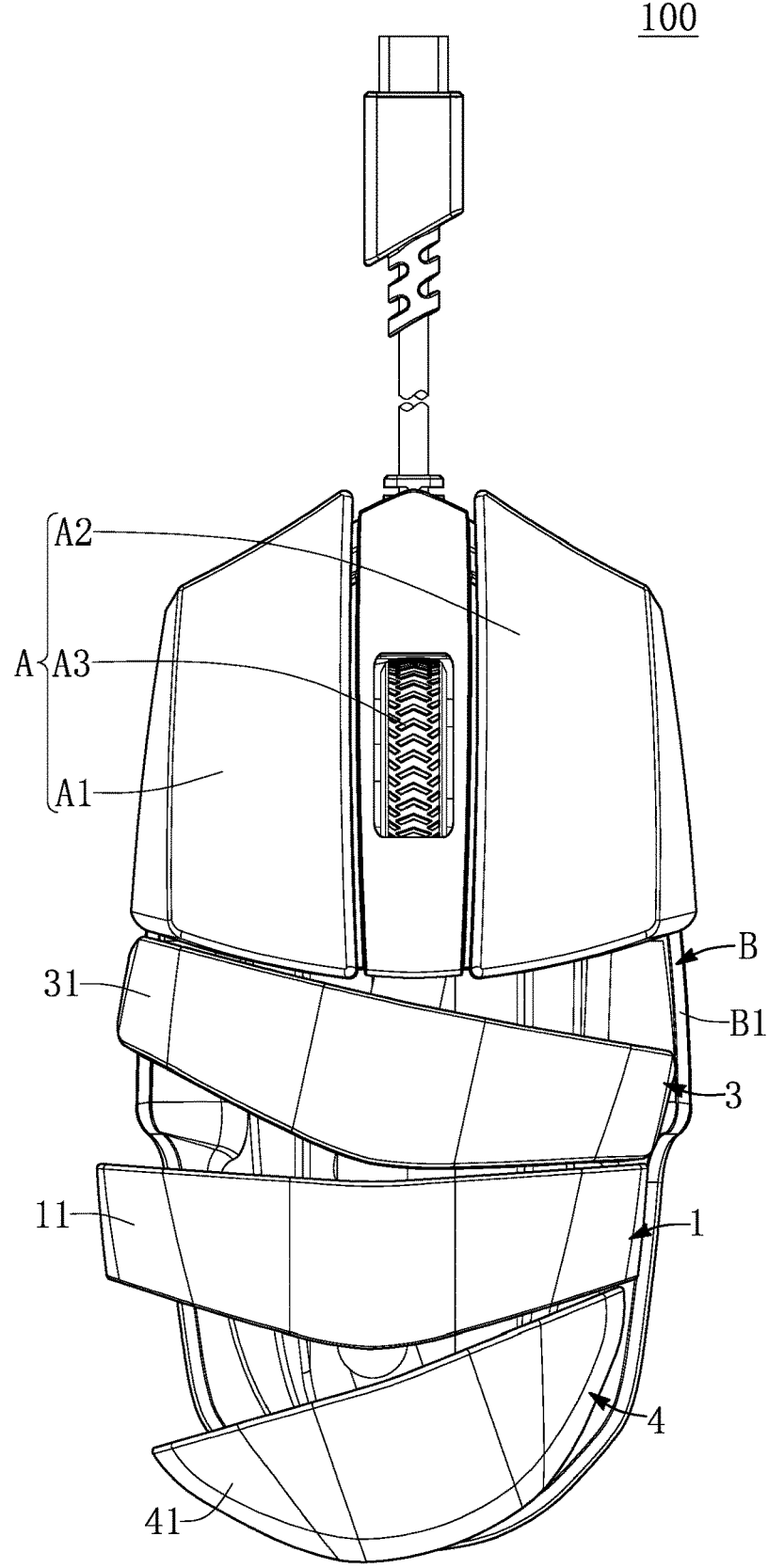
FIG. 8 is a top view showing the housing module of the mouse being operated to be adapted for a left-handed user according to the present disclosure.

The housing module C is detachably fixed with the bottom casing B1 of the circuit base B. For example, the housing module C can be fixed with the bottom casing B1 through a plurality of screws S. The housing module C includes a movable housing 1, a fixing assembly 2, and two rotatable housings. The movable housing 1 is operable to move left or right relative to the circuit base B and switch among a middle position (as shown in FIG. 6), a left-side position (as shown in FIG. 7), and a right-side position (FIG. 8). The fixing assembly 2 is configured to fix the movable housing 1 located at the middle position, the left-side position, or the right-side position with the circuit base B.

The two rotatable housings are defined as a first rotatable housing 3 and a second rotatable housing 4, respectively. The movable housing 1 is located between the first rotatable housing 3 and the second rotatable housing 4, and the movable housing 1, the first rotatable housing 3, and the second rotatable housing 4 are spaced apart from one another. The first rotatable housing 3 is disposed adjacent to the key module A.

The first rotatable housing 3 is operable to rotate clockwise or counterclockwise relative to the circuit base B, so as to switch among a middle position (as shown in FIG. 6), a counterclockwise-rotated position (as shown in FIG. 7), and a clockwise-rotated position (as shown in FIG. 8). The second rotatable housing 4 is operable to rotate clockwise or counterclockwise relative to the circuit base B, so as to switch among a middle position (as shown in FIG. 6), a clockwise-rotated position (as shown in FIG. 7), and a counterclockwise-rotated position (as shown in FIG. 8).

As shown in FIG. 4 and FIG. 5, the fixing assembly 2 is configured to fix the movable housing 1 located at the left-side position, the middle position, or the right-side position with the circuit base B. Moreover, the fixing assembly 2 can fix the first rotatable housing 3 located at the counterclockwise-rotated position or the clockwise-rotated position with the circuit base B, and the fixing assembly 2 can also fix the second rotatable housing 4 located at the counterclockwise-rotated position or the clockwise-rotated position with the circuit base B.

As shown in FIG. 6, if the movable housing 1, the first rotatable housing 3, and the second rotatable housing 4 are each arranged at the middle position by a user, the mouse 100 is adapted for both a left-handed user and a right-handed user. As shown in FIG. 7, if the movable housing 1 is arranged at the right-side position, the first rotatable housing 3 is arranged at the counterclockwise-rotated position, and the second rotatable housing 4 is arranged at the clockwise-rotated position, the mouse 100 is adapted for the right-handed user. As shown in FIG. 8, if the movable housing is arranged at the left-side position, the first rotatable housing 3 is arranged at the clockwise-rotated position, and the second rotatable housing 4 is arranged at the counterclockwise-rotated position, the mouse 100 is adapted for the left-handed user.

In practice, the fixing assembly 2 can include, for example, one screw. The movable housing 1, the first rotatable housing 3, and the second rotatable housing 4 can be interlinked with one another. For example, by only fixing the movable housing 1 with the circuit base B, the fixing assembly 2 can fix both the first rotatable housing 3 and the second rotatable housing 4 with the circuit base B at the same time (as will be illustrated in greater detail below). However, the present disclosure is not limited thereto.

In different embodiments, the fixing assembly 2 can also include three screws. The movable housing 1, the first rotatable housing 3, and the second rotatable housing 4 can be not interlinked with one another. Further, the movable housing 1, the first rotatable housing 3, and the second rotatable housing 4 are each fixed with the circuit base B by one screw.

It is worth mentioning that, in an exemplary embodiment, when the movable housing 1, the first rotatable housing 3, and the second rotatable housing 4 are located at the middle position (as shown in FIG. 6), a distance D1 between one side of the movable housing 1 and one side of the adjacent first rotatable housing 3 gradually increases in an outward direction from a center of the movable housing 1. A distance D2 between one side of the second rotatable housing 4 and another side of the movable housing 1 gradually increases in the outward direction from a center of the second rotatable housing 4. Through this configuration, when the movable housing 1 is located at the right-side position, the first rotatable housing 3 is located at the counterclockwise-rotated position, and the second rotatable housing 4 is located at the clockwise-rotated position, distances of the movable housing 1, the first rotatable housing 3, and the second rotatable housing 4 can be minimized as much as possible, such that the shape of the mouse 100 is more suitable for the right-handed user. Similarly, when the movable housing 1 is located at the left-side position, the first rotatable housing 3 is located at the clockwise-rotated position, and the second rotatable housing 4 is located at the counterclockwise-rotated position, the distances of the movable housing 1, the first rotatable housing 3, and the second rotatable housing 4 can be minimized as much as possible, such that the shape of the mouse 100 is more suitable for the left-handed user.

Figure 9:
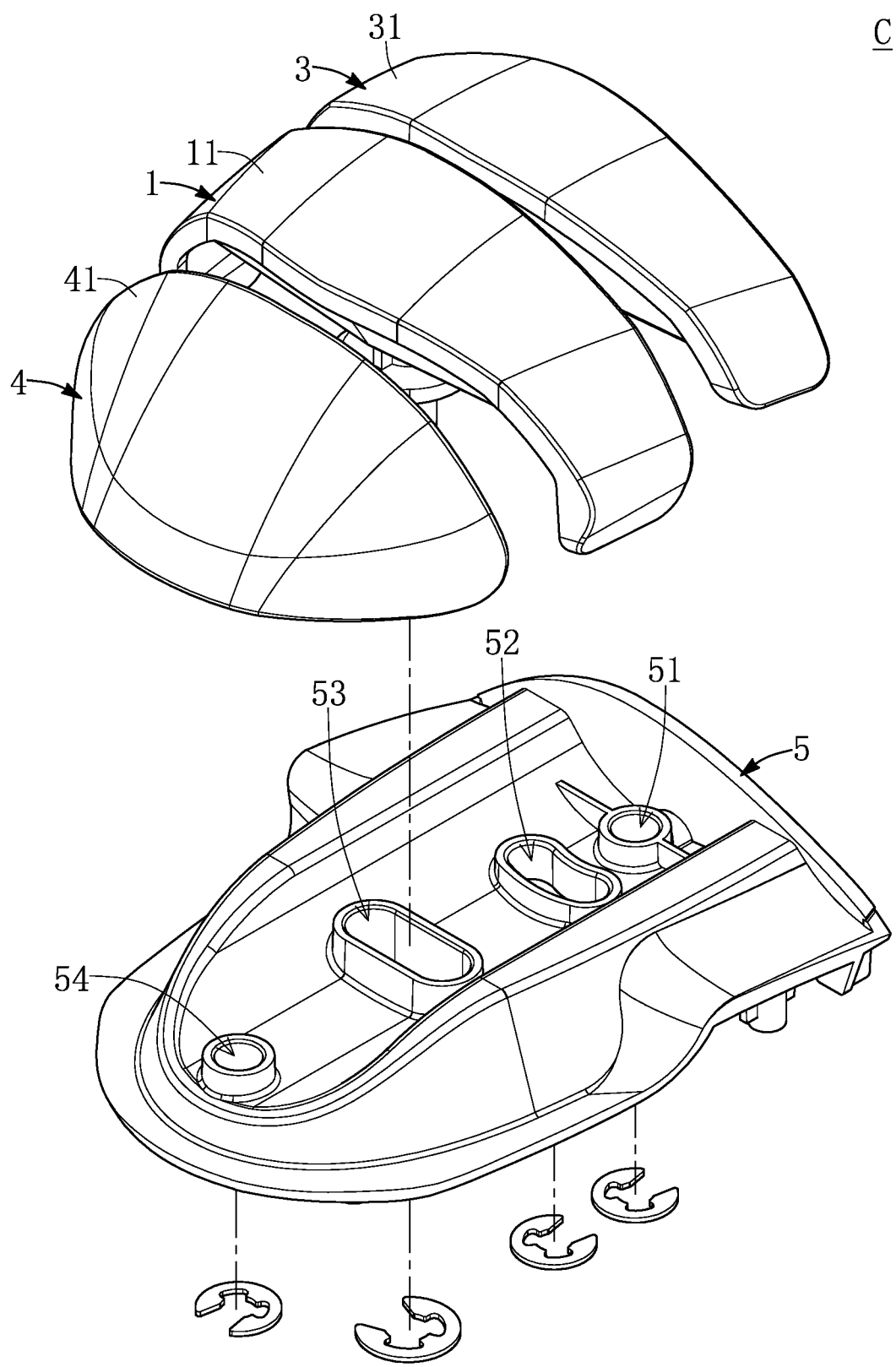
FIG. 9 and FIG. 10 are each a partial exploded view of the housing module of the mouse according to the present disclosure from different angles of view.
Figure 10:
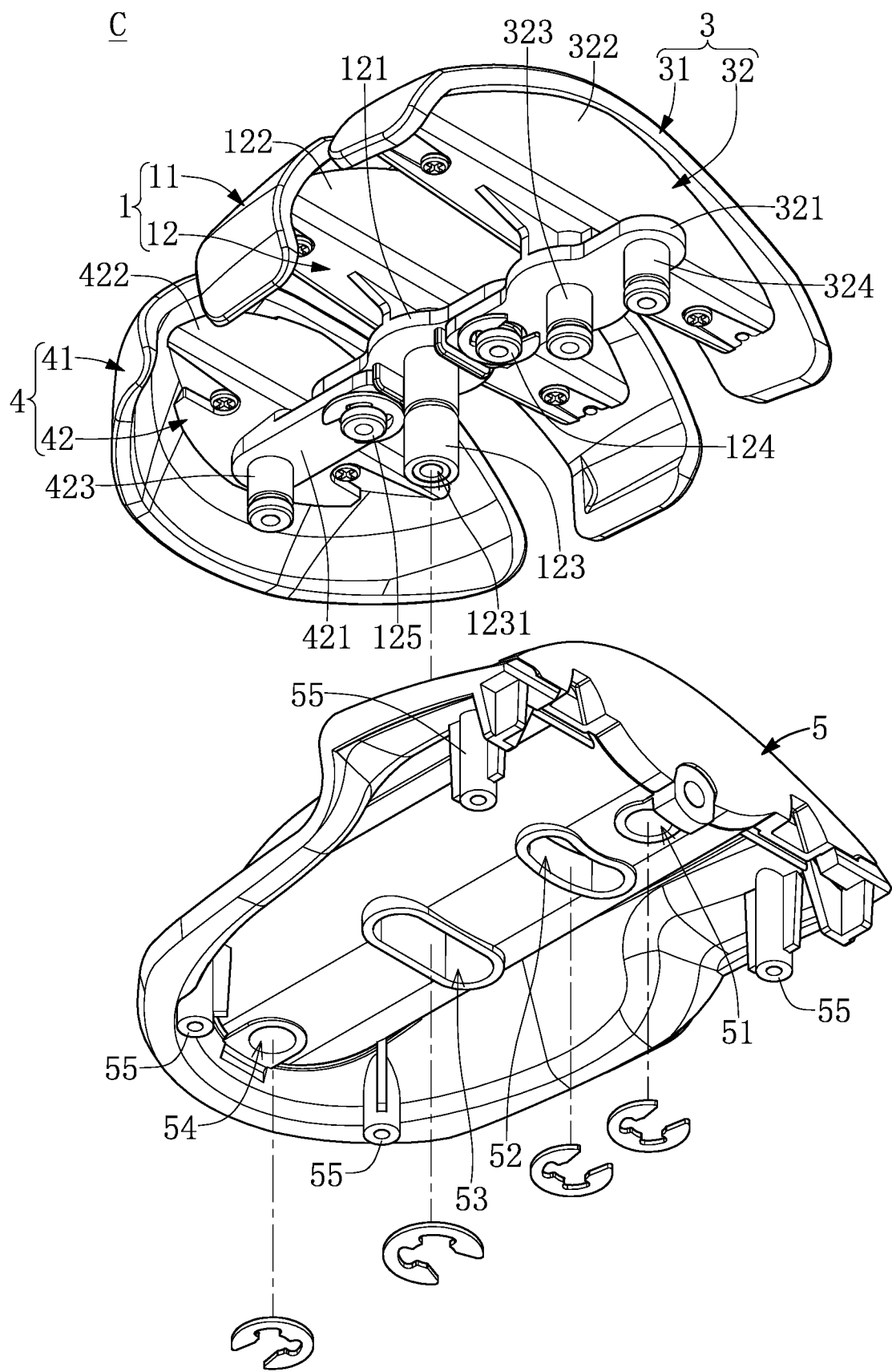

Reference is made to FIG. 4, FIG. 5, FIG. 9, and FIG. 10. FIG. 9 and FIG. 10 are each a partial exploded view of the housing module of the mouse according to the present disclosure from different angles of view. The housing module C further includes a bottom panel 5. The movable housing 1, the first rotatable housing 3, and the second rotatable housing 4 can each be movably connected to the bottom panel 5. The bottom panel 5 can be detachably fixed with the bottom casing B1 of the circuit base B through, for example, the plurality of screws S.

The movable housing 1, the first rotatable housing 3 and the second rotatable housing 4 are each movably connected to the bottom panel 5. When the movable housing 1 is being operated, the movable housing 1 moves relative to the bottom panel 5. When the first rotatable housing 3 is being operated, the first rotatable housing 3 rotates relative to the bottom panel 5. When the second rotatable housing 4 is being operated, the second rotatable housing 4 rotates relative to the bottom panel 5.

Figure 11:
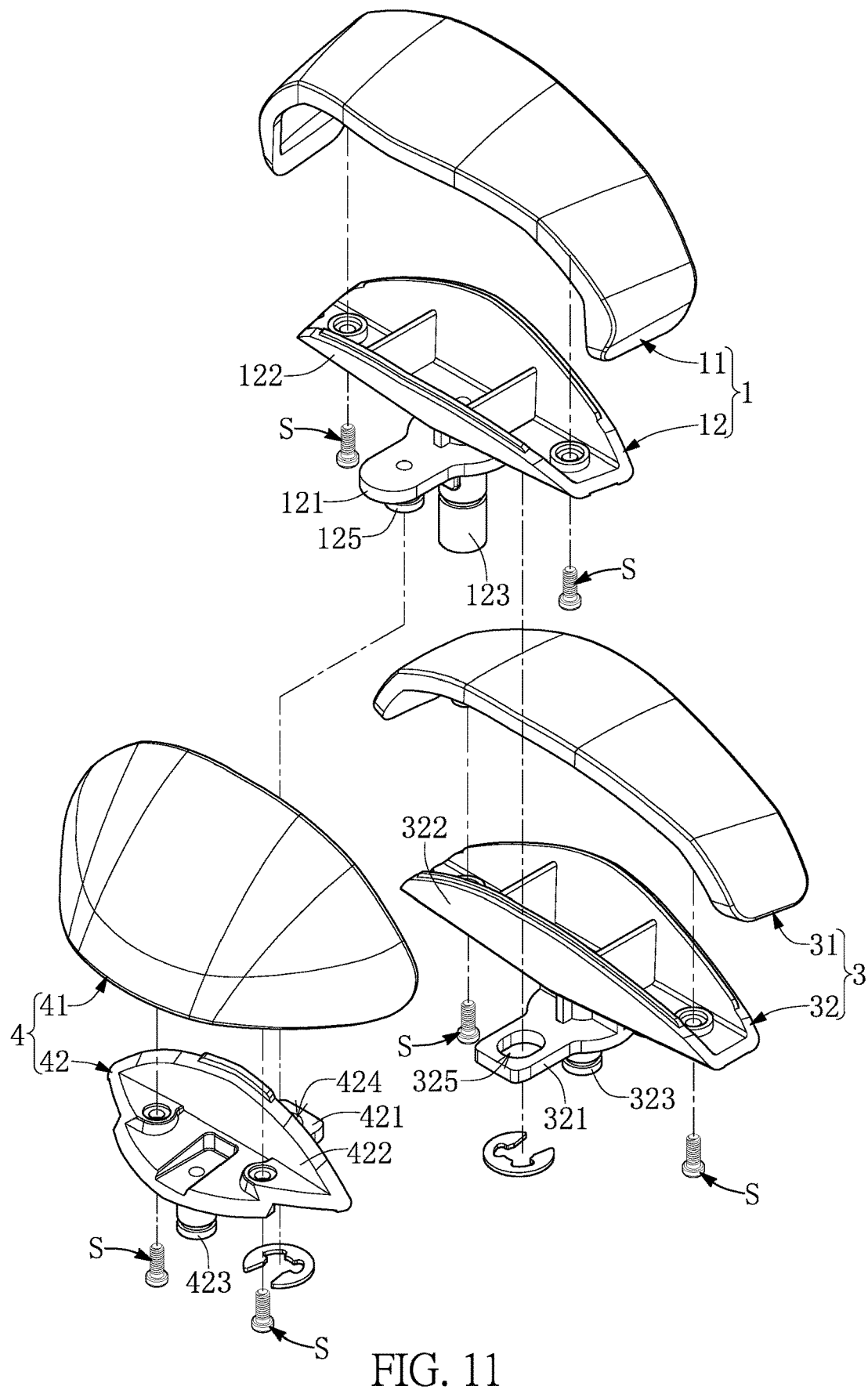
FIG. 11 and FIG. 12 are each a schematic exploded view showing partial components of the housing module of the mouse according to the present disclosure from different angles of view.
Figure 12:
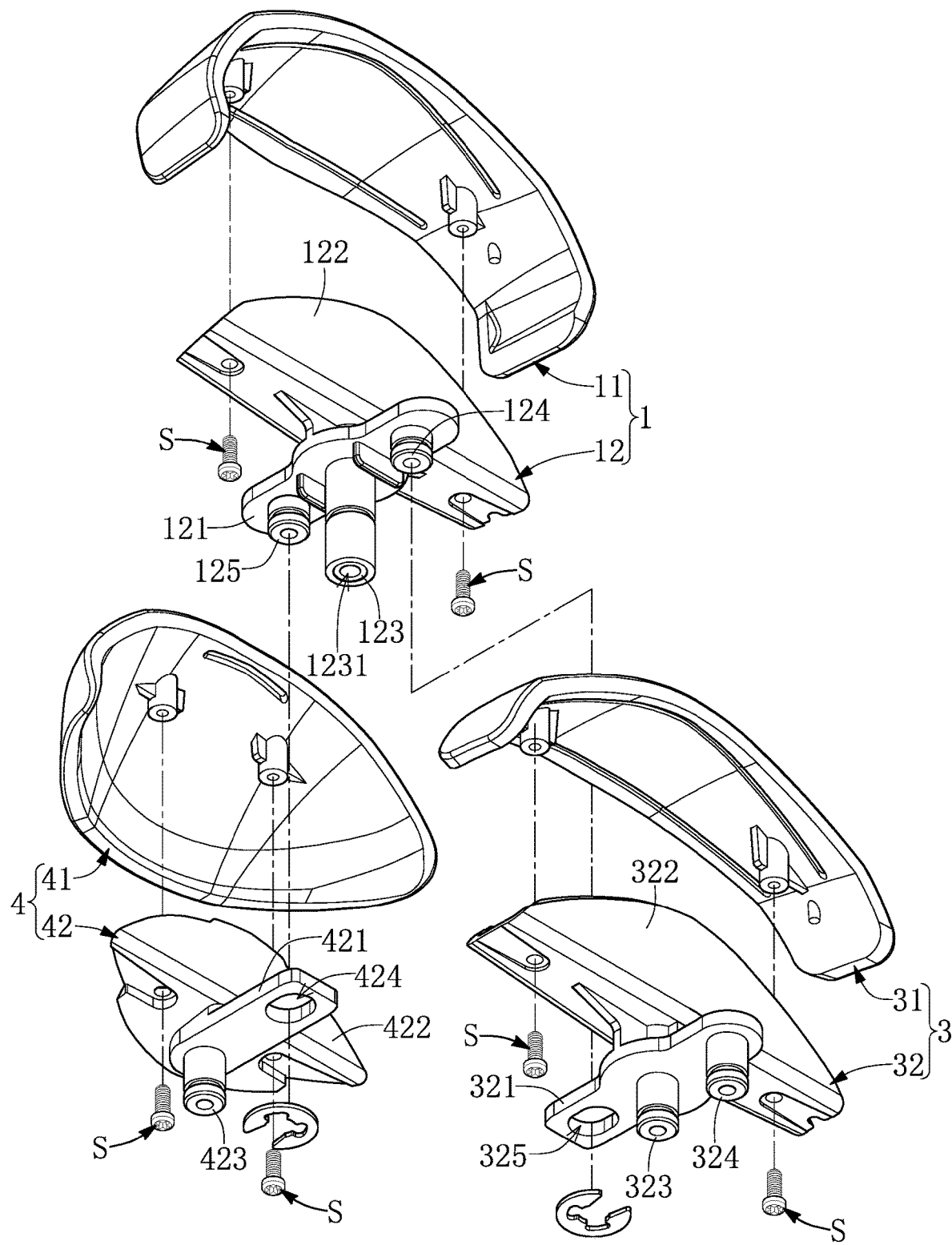
Figure 13:
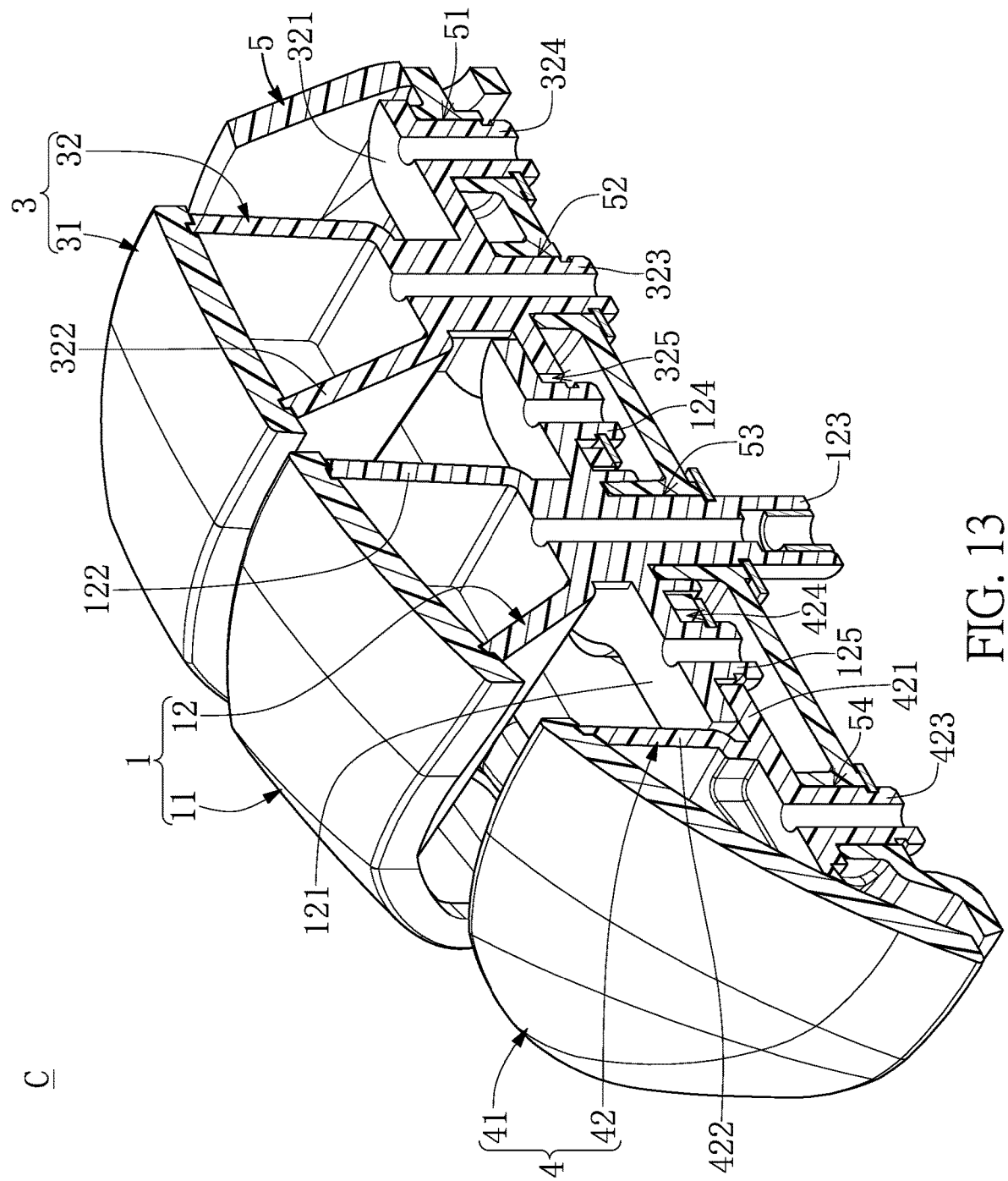
FIG. 13 is a schematic cross-sectional view of the housing module of the mouse according to the present disclosure.
Figure 14:
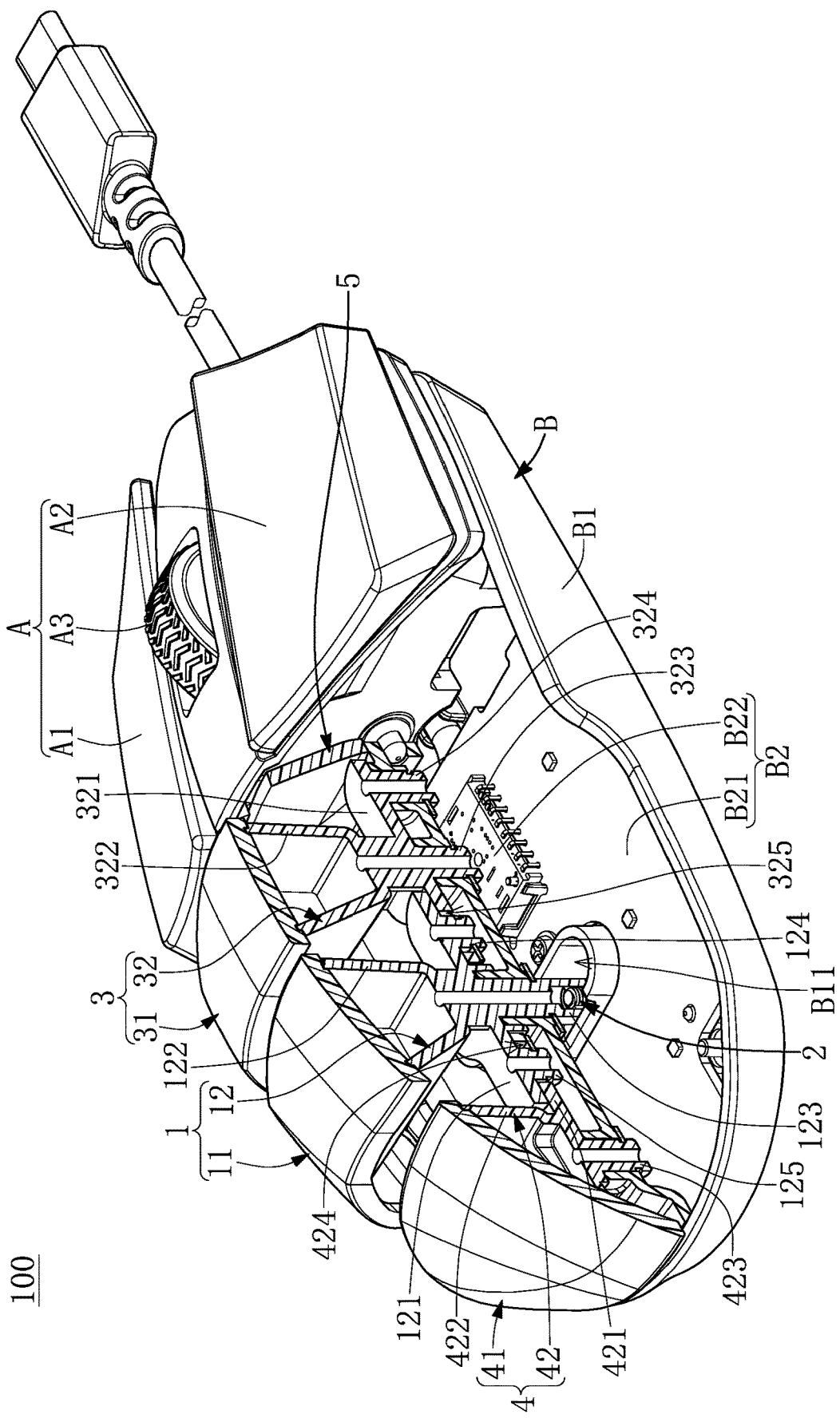
FIG. 14 is a partial cross-sectional view of the mouse according to the present disclosure.

Reference is made to FIG. 9 to FIG. 12. FIG. 11 and FIG. 12 are each a schematic exploded view showing partial components of the housing module of the mouse according to the present disclosure from different angles of view. Specifically, the movable housing 1, the first rotatable housing 3, and the second rotatable housing 4 each include an exterior member and a linkage member. For ease of illustration, the exterior members included in the first rotatable housing 3, the movable housing 1, and the second rotatable housing 4 are defined as a first exterior member 31, a second exterior member 11, and a third exterior member 41, respectively. The linkage members included in the first rotatable housing 3, the movable housing 1, and the second rotatable housing 4 are defined as a first linkage member 32, a second linkage member 12, and a third linkage member 42, respectively.

The first linkage member 32 includes a first main body 321, a first fixing structure 322, an auxiliary limiting structure 323, a first base pivot structure 324, and a first linkage pivot structure 325. One side of the first main body 321 is connected to the first fixing structure 322. The first fixing structure 322 can be detachably fixed with the first exterior member 31 through a plurality of fasteners (e.g., screws). The auxiliary limiting structure 323 is disposed on another side of the first main body 321. The first base pivot structure 324 and the first linkage pivot structure 325 are disposed on two ends of the first main body 321, respectively. The auxiliary limiting structure 323 is located between the first base pivot structure 324 and the first linkage pivot structure 325.

The first base pivot structure 324 and the first linkage pivot structure 325 can be, for example, a substantially cylindrical structure. The first base pivot structure 324 passes through a first pivot structure 51 (e.g., a through hole) of the bottom panel 5, and the first linkage pivot structure 325 is disposed in an auxiliary limiting groove 52 of the bottom panel 5 (e.g., the auxiliary limiting groove 52 being configured to penetrate through the bottom panel 5). The auxiliary limiting groove 52 can be, for example, an arc-shaped groove. When the first exterior member 31 is being operated, the first linkage member 32 rotates relative to the bottom panel 5 through the first base pivot structure 324, and the auxiliary limiting structure 323 correspondingly moves in the auxiliary limiting groove 52. The auxiliary limiting structure 323 and the auxiliary limiting groove 52 jointly limit a rotation range of the first rotatable housing 3 in a leftward direction or a rightward direction.

It is worth mentioning that when the first rotatable housing 3 is operated to rotate relative to the circuit base B (as shown in FIG. 1), due to the auxiliary limiting groove 52 being the arc-shaped groove, the first rotatable housing 3 not only moves left or right relative to the circuit base B but also rotates clockwise or counterclockwise relative to the circuit base B at the same time. Through this configuration, when the first rotatable housing 3 is moved to the counterclockwise-rotated position or the clockwise-rotated position, the shape jointly formed by the first rotatable housing 3 and the circuit base B can be more ergonomic.

The second linkage member 12 includes a second main body 121, a second fixing structure 122, a limiting structure 123, and two second linkage pivot structures 124, 125. One side of the second main body 121 is fixed with the second fixing structure 122. The second fixing structure 122 can be detachably fixed with the second exterior member 11 through the plurality of fasteners (e.g., screws). The limiting structure 123 is disposed on another side of the second main body 121. The two second linkage pivot structures 124, 125 are disposed on two ends of the second main body 121, respectively. The limiting structure 123 is located between the two second linkage pivot structures 124, 125.

The limiting structure 123 can be, for example, a substantially cylindrical structure, and is used to pass through a limiting groove 53 of the bottom panel 5 (e.g., the limiting groove 53 being configured to penetrate through the bottom panel 5). The limiting groove 53 is a straight groove. When the second exterior member 11 is being operated, the limiting structure 123 moves left or right in a linear manner in the limiting groove 53, and the movable housing 1 moves left or right in a linear manner relative to the bottom panel 5.

The second linkage pivot structure 124 and the first linkage pivot structure 325 are pivotally connected to each other. When the second linkage member 12 moves relative to the bottom panel 5, the second linkage member 12 drives actuation of the first linkage member 32 through the second linkage pivot structure 124 and the first linkage pivot structure 325, such that the first linkage member 32 moves relative to the bottom panel 5. In practice, the two second linkage pivot structures 124, 125 can be substantially cylindrical structures, and the first linkage pivot structure 325 can be, for example, a through hole that penetrates through the first linkage member 32.

The third linkage member 42 includes a third main body 421, a third fixing structure 422, a third base pivot structure 423, and a third linkage pivot structure 424. One side of the third main body 421 is connected to the third fixing structure 422. The third fixing structure 422 can be detachably fixed with the third exterior member 41 through the plurality of fasteners (e.g., screws). The third base pivot structure 423 and the third linkage pivot structure 424 are disposed on two ends of the third main body 421, respectively. The third base pivot structure 423 is pivotally connected to a second pivot structure 54 of the bottom panel 5, and the third linkage pivot structure 424 is pivotally connected to the second linkage pivot structure 124 of the second linkage member 12. For example, the third base pivot structure 423 can be a substantially cylindrical structure, the second pivot structure 54 of the bottom panel 5 can be a through hole that penetrates through the bottom panel 5, the third linkage pivot structure 424 can be a through hole that penetrates through the third main body 421, and the second linkage pivot structure 125 that is pivotally connected to the third linkage pivot structure 424 can be a substantially cylindrical structure. However, the present disclosure is not limited thereto.

When the second exterior member 11 is being operated, and the movable housing 1 moves left or right in a linear manner relative to the bottom panel 5, the second linkage member 12 drives the third linkage member 42 to rotate relative to the bottom panel 5 through the second linkage pivot structure 125 and the third linkage pivot structure 424.

Reference is made to FIG. 5, FIG. 10, FIG. 13, and FIG. 14. In practice, the bottom panel 5 of the housing module C can include a plurality of locking structures 55, and the bottom casing B1 of the circuit base B correspondingly has a plurality of through holes B11. The bottom panel 5 and the bottom casing B1 can be interlocked with each other through the plurality of screws S. The limiting structure 123 of the movable housing 1 can have a threaded hole 1231. The screw included in the fixing assembly 2 passes through the limiting groove 53 of the bottom casing B1, so as to be interlocked with the threaded hole 1231 of the limiting structure 123. Accordingly, the first linkage member 32 and the bottom casing B1 are fixed with each other.

When the movable housing 1, the first rotatable housing 3 and the second rotatable housing 4 are located at the middle position, and the movable housing 1 is not fixed with the circuit base B by the fixing assembly 2, through the structures included in each of the first linkage member 32, the second linkage member 12, and the third linkage member 42, the user whose dominant hand is the right hand only needs to move the movable housing 1 in the rightward direction, and the second linkage member 12 of the movable housing 1 can directly and synchronously drive the first linkage member 32 and the third linkage member 42, thereby causing the first rotatable housing 3 to automatically rotate counterclockwise and the second rotatable housing 4 to automatically rotate clockwise. In this way, the first rotatable housing 3 is automatically changed to the counterclockwise-rotated position, and the second rotatable housing 4 is automatically changed to the clockwise-rotated position. That is, the user whose dominant hand is the right hand only needs to move the movable housing 1 shown in FIG. 6 in the rightward direction, and the first rotatable housing 3 and the second rotatable housing 4 can be synchronously driven by the second linkage member 12 and be automatically changed to the state shown in FIG. 7. Then, the user can fix the second linkage member 12 with the circuit base B merely by operating the fixing assembly 2.

On the other hand, the user whose dominant hand is the left hand only needs to move the movable housing 1 shown in FIG. 6 in the leftward direction, and the first rotatable housing 3 and the second rotatable housing 4 can be synchronously driven by the second linkage member 12 and be automatically changed to the state shown in FIG. 8. Then, the user can fix the second linkage member 12 with the circuit base B merely by operating the fixing assembly 2.

It should be noted that the housing module C in the above-described embodiment is exemplified as including three housings that are movable relative to the circuit base B (i.e., the movable housing 1, the first rotatable housing 3, and the second rotatable housing 4). However, a quantity of the movable housings included in the housing module C is not limited thereto. In another embodiment, the movable housing 1 can be the only housing that is movable relative to the circuit base B, and the rest of the housings included in the housing module C cannot move relative to the circuit base B. Or, in yet another embodiment, the housing module C can include two or more than two movable housings 1, two or more than two first rotatable housings 3, and two or more than two second rotatable housings 4.

A back cover of a holding device adjustable for left and right hand shapes provided in the present disclosure refers to the housing module C mentioned above (the housing module C will not be described in further detail hereinafter). In other words, the above-mentioned housing module C can be independently implemented, sold, and manufactured, and the housing module C is not limited to being sold or manufactured along with the above-mentioned mouse 100.

Beneficial Effects of the Embodiment

In conclusion, through configuration of the movable housing, the first rotatable housing and the second rotatable housing included in the housing module, the mouse of the present disclosure allows users with different dominant hands to adjust the movable housing, the first rotatable housing, and the second rotatable housing according to practical requirements. In this way, the shape of the mouse can be changed, and the mouse can be adapted to suit the dominant hand of the user. In addition, since mouse manufacturers will no longer need to release products respectively for the users with different dominant hands, production and management costs can be significantly decreased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse, comprising:
   a key module including at least one button unit;
   a circuit base including a bottom casing and a control module, wherein the control module is electrically connected to the at least one button unit; and
   a housing module fixed to the circuit base, wherein the housing module includes:
      at least one movable housing, wherein the at least one movable housing is operable to move left or right relative to the circuit base and switch between a left-side position and a right-side position;
      a fixing assembly, wherein the fixing assembly is operable to fix the at least one movable housing, which is located at the left-side position or the right-side position, with the circuit base; and
      at least two rotatable housings, wherein the at least one movable housing is located between the at least two rotatable housings, and the at least one movable housing and the at least two rotatable housings are spaced apart from one another;
   wherein the mouse is adapted for a right-handed user when the at least one movable housing is located at the left-side position, and the mouse is adapted for a left-handed user when the at least one movable housing is located at the right-side position;
   wherein each of the at least two rotatable housings is operable to rotate clockwise or counterclockwise relative to the circuit base, and is fixed at a counterclockwise-rotated position or a clockwise-rotated position; wherein, when the at least two rotatable housings are respectively located at the counterclockwise-rotated position and the clockwise-rotated position and the at least one movable housing is located at the left-side position, the mouse is adapted for the right-handed user; and
   wherein, when the at least two rotatable housings are respectively located at the clockwise-rotated position and the counterclockwise-rotated position and the at least one movable housing is located at the right-side position, the mouse is adapted for the left-handed user.

2. The mouse according to claim 1, wherein the at least one movable housing is operable to switch among the left-side position, the right-side position, and a middle position, and the fixing assembly is operable to fix the at least one movable housing located at the middle position with the circuit base; wherein the mouse is adapted for the right-handed user and the left-handed user when the at least one movable housing is located at the middle position.

3. The mouse according to claim 1, wherein each of the at least two rotatable housings is operable to be located at a middle position; wherein, when the at least two rotatable housings and the at least one movable housing are located at the middle position, a distance between one side of the at least one movable housing and one side of an adjacent one of the at least two rotatable housings gradually increases in an outward direction from a center of the at least one movable housing, and a distance between one side of another one of the at least two rotatable housings and another side of the at least one movable housing gradually increases in the outward direction from a center of the another one of the at least two rotatable housings.

4. The mouse according to claim 1, wherein the at least one movable housing includes an exterior member and a linkage member, one side of the exterior member is connected to the linkage member, another side of the exterior member is provided for a palm of a user to abut against, and the linkage member is connected to at least one of the at least two rotatable housings; wherein, when the exterior member is operated to move right or left relative to the circuit base, the linkage member drives the connected rotatable housing to rotate clockwise or counterclockwise; wherein the fixing assembly is used to fix the linkage member, so that the linkage member is immovable relative to the circuit base.

5. The mouse according to claim 4, wherein the exterior member is detachably connected to the linkage member.

6. The mouse according to claim 4, wherein the linkage member and the at least two rotatable housings are connected to one another; wherein, when the exterior member is operated to move right or left relative to the circuit base, one of the at least two rotatable housings is synchronously driven by the linkage member to rotate clockwise, and another one of the at least two rotatable housings is synchronously driven by the linkage member to rotate counterclockwise; wherein, when the circuit base and the at least one movable housing located at the left-side position are fixed with each other by the fixing assembly, one of the at least two rotatable housings is located at the clockwise-rotated position and another one of the at least two rotatable housings is located at the counterclockwise-rotated position; wherein, when the circuit base and the at least one movable housing located at the right-side position are fixed with each other by the fixing assembly, one of the at least two rotatable housings is located at the counterclockwise-rotated position and another one of the at least two rotatable housings is located at the clockwise-rotated position.

7. The mouse according to claim 6, wherein the housing module includes a bottom panel, one of the at least two rotatable housings includes a first exterior member and a first linkage member, the exterior member and the linkage member of the at least one movable housing are respectively defined as a second exterior member and a second linkage member, and another one of the at least two rotatable housings includes a third exterior member and a third linkage member; wherein one end of the first linkage member is pivotally connected to the bottom panel, another end of the first linkage member is pivotally connected to the second linkage member, a limiting structure of the second linkage member passes through a limiting groove of the bottom panel, the second linkage member is pivotally connected to one end of the third linkage member, and another end of the third linkage member is pivotally connected to the bottom panel; wherein, when the second exterior member is operated to move left or right, the limiting structure moves along the limiting groove, the second linkage member drives the first linkage member to rotate clockwise or counterclockwise relative to the bottom panel, and the second linkage member further drives the third linkage member to rotate counterclockwise or clockwise relative to the bottom panel.

8. The mouse according to claim 7, wherein the bottom panel further includes an auxiliary limiting groove, the auxiliary limiting groove is arc-shaped, and an auxiliary limiting structure of the first linkage member passes through the auxiliary limiting groove; wherein, when the first linkage member is synchronously driven by the second linkage member, the auxiliary limiting structure moves along the auxiliary limiting groove, and the first linkage member rotates and moves relative to the bottom panel.

9. The mouse according to claim 7, wherein the first linkage member includes a first main body and a first fixing structure, the first main body is connected to the first fixing structure, and the first exterior member is detachably fixed with the first fixing structure; wherein the second linkage member includes a second main body and a second fixing structure, the second main body is connected to the second fixing structure, and the second exterior member is detachably fixed with the second fixing structure; wherein the third linkage member includes a third main body and a third fixing structure, the third main body is connected to the third fixing structure, and the third exterior member is detachably fixed with the third fixing structure.

10. A back cover of a holding device adjustable for left and right hand shapes, which is fixed to a circuit base of a mouse, the back cover comprising:
   at least one movable housing, wherein the at least one movable housing is operable to move left or right relative to the circuit base and switch between a left-side position and a right-side position;
   a fixing assembly, wherein the fixing assembly is operable to fix the at least one movable housing, which is located at the left-side position or the right-side position, with the circuit base; and
   at least two rotatable housings, wherein the at least one movable housing is located between the at least two rotatable housings, and the at least one movable housing and the at least two rotatable housings are spaced apart from one another;
   wherein the mouse is adapted for a right-handed user when the at least one movable housing is located at the left-side position, and the mouse is adapted for a left-handed user when the at least one movable housing is located at the right-side position;
   wherein each of the at least two rotatable housings is operable to rotate clockwise or counterclockwise relative to the circuit base, and is fixed at a counterclockwise-rotated position or a clockwise-rotated position; wherein, when the at least two rotatable housings are respectively located at the counterclockwise-rotated position and the clockwise-rotated position and the at least one movable housing is located at the left-side position, the mouse is adapted for the right-handed user;
   wherein, when the at least two rotatable housings are respectively located at the clockwise-rotated position and the counterclockwise-rotated position and the at least one movable housing is located at the right-side position, the mouse is adapted for the left-handed user.

11. The back cover according to claim 10, wherein the at least one movable housing is operable to switch among the left-side position, the right-side position, and a middle position, and the fixing assembly is operable to fix the at least one movable housing located at the middle position with the circuit base; wherein the mouse is adapted for the right-handed user and the left-handed user when the at least one movable housing is located at the middle position.

12. The back cover according to claim 10, wherein each of the at least two rotatable housings is operable to be located at a middle position; wherein, when the at least two rotatable housings and the at least one movable housing are located at the middle position, a distance between one side of the at least one movable housing and one side of an adjacent one of the at least two rotatable housings gradually increases in an outward direction from a center of the at least one movable housing, and a distance between one side of another one of the at least two rotatable housings and another side of the at least one movable housing gradually increases in the outward direction from a center of the another one of the at least two rotatable housings.

13. The back cover according to claim 10, wherein the at least one movable housing includes an exterior member and a linkage member, one side of the exterior member is connected to the linkage member, another side of the exterior member is provided for a palm of a user to abut against, and the linkage member is connected to at least one of the at least two rotatable housings; wherein, when the exterior member is operated to move right or left relative to the circuit base, the linkage member drives the connected rotatable housing to rotate clockwise or counterclockwise; wherein the fixing assembly is used to fix the linkage member, so that the linkage member is immovable relative to the circuit base.

14. The back cover according to claim 13, wherein the exterior member is detachably connected to the linkage member.

15. The back cover according to claim 13, wherein the linkage member and the at least two rotatable housings are connected to one another; wherein, when the exterior member is operated to move right or left relative to the circuit base, one of the at least two rotatable housings is synchronously driven by the linkage member to rotate clockwise, and another one of the at least two rotatable housings is synchronously driven by the linkage member to rotate counterclockwise; wherein, when the circuit base and the at least one movable housing located at the left-side position are fixed with each other by the fixing assembly, one of the at least two rotatable housings is located at the clockwise-rotated position and another one of the at least two rotatable housings is located at the counterclockwise-rotated position; wherein, when the circuit base and the at least one movable housing located at the right-side position are fixed with each other by the fixing assembly, one of the at least two rotatable housings is located at the counterclockwise-rotated position and another one of the at least two rotatable housings is located at the clockwise-rotated position.

16. The back cover according to claim 15, further comprising a bottom panel, wherein one of the at least two rotatable housings includes a first exterior member and a first linkage member, the exterior member and the linkage member of the at least one movable housing are respectively defined as a second exterior member and a second linkage member, and another one of the at least two rotatable housings includes a third exterior member and a third linkage member; wherein one end of the first linkage member is pivotally connected to the bottom panel, another end of the first linkage member is pivotally connected to the second linkage member, a limiting structure of the second linkage member passes through a limiting groove of the bottom panel, the second linkage member is pivotally connected to one end of the third linkage member, and another end of the third linkage member is pivotally connected to the bottom panel; wherein, when the second exterior member is operated to move left or right, the limiting structure moves along the limiting groove, the second linkage member drives the first linkage member to rotate clockwise or counterclockwise relative to the bottom panel, and the second linkage member further drives the third linkage member to rotate counterclockwise or clockwise relative to the bottom panel.

17. The back cover according to claim 16, wherein the bottom panel further includes an auxiliary limiting groove, the auxiliary limiting groove is arc-shaped, and an auxiliary limiting structure of the first linkage member passes through the auxiliary limiting groove; wherein, when the first linkage member is synchronously driven by the second linkage member, the auxiliary limiting structure moves along the auxiliary limiting groove, and the first linkage member rotates and moves relative to the bottom panel.

18. The back cover according to claim 16, wherein the first linkage member includes a first main body and a first fixing structure, the first main body is connected to the first fixing structure, and the first exterior member is detachably fixed with the first fixing structure; wherein the second linkage member includes a second main body and a second fixing structure, the second main body is connected to the second fixing structure, and the second exterior member is detachably fixed with the second fixing structure; wherein the third linkage member includes a third main body and a third fixing structure, the third main body is connected to the third fixing structure, and the third exterior member is detachably fixed with the third fixing structure.

* * * * *